No. 797,887. PATENTED AUG. 22, 1905.
C. F. DIBBLE.
PAIL COVER.
APPLICATION FILED MAR. 13, 1905.

WITNESSES:
Arthur W. Crossley
S. L. Burket

INVENTOR.
Charles F. Dibble,
By Lewis Bagger & Co.
Attorneys

UNITED STATES PATENT OFFICE.

CHARLES F. DIBBLE, OF ROCHESTER, MINNESOTA.

PAIL-COVER.

No. 797,887.     Specification of Letters Patent.     Patented Aug. 22, 1905.

Application filed March 13, 1905. Serial No. 249,867.

*To all whom it may concern:*

Be it known that I, CHARLES F. DIBBLE, a citizen of the United States, residing at Rochester, in the county of Olmstead and State of Minnesota, have invented new and useful Improvements in Pail-Covers, of which the following is a specification.

This invention has relation to pail-covers and covers for barrels and other means in which fruit, candies, spices, desiccated cocoanut, stock-food, and the like may be shipped to market or offered for sale.

The particular class of pail-covers to which my invention has reference is those containing means for showing through a glass the kind and quality of the articles contained in the pail or other means and presented for sale.

It is the object of the invention to provide a cover for pails or other means which shall be strong and durable, in which the danger of breaking the glass is reduced to a minimum, and which shall be commodious and serviceable to the utmost degree.

To these ends the invention consists of the improvements hereinafter shown and described, reference being had to the annexed drawings, forming a part of this specification, and of which—

Figure 1:
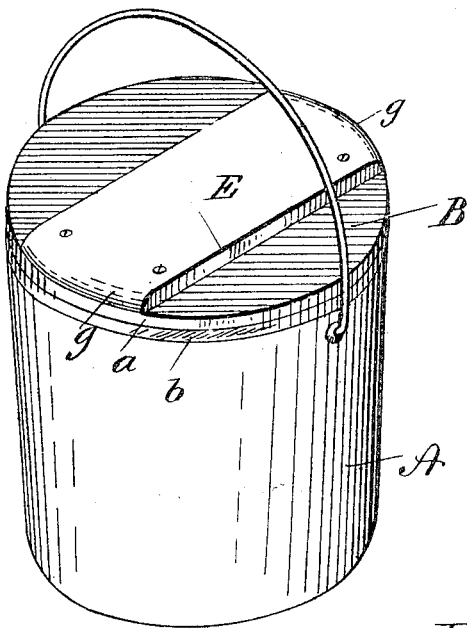
Figure 2:
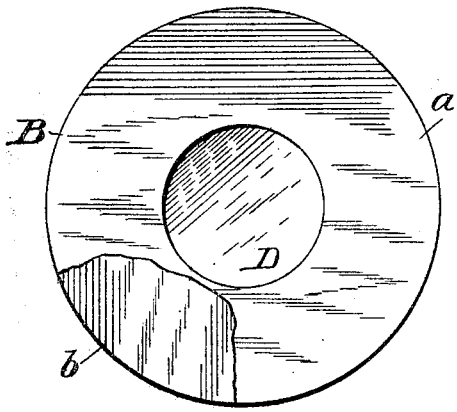
Figure 4:
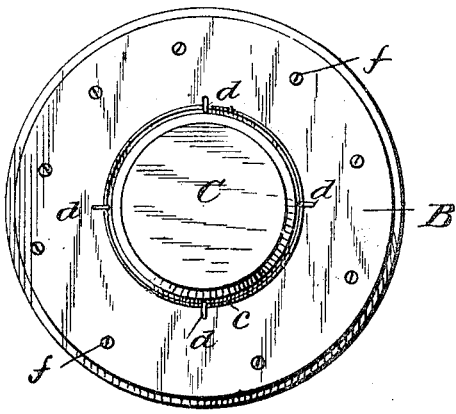
Figure 3:
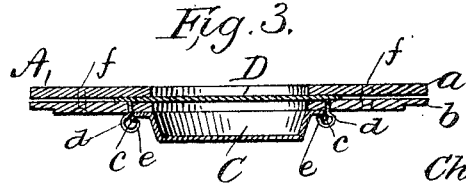

Figure 1 is a perspective view of a pail provided with my improved cover complete. Fig. 2 is a plan view of the cover with the glass-protecting board removed and a portion of the upper board broken away to show the direction in which the grain runs in the two boards which go to make up the body of the cover. Fig. 3 is a vertical central sectional view on the line 3 3, Fig. 2. Fig. 4 is a bottom view.

The same letters of reference designate the same parts or features, as the case may be, in all the views.

In the drawings, A designates a pail, which might as well be a barrel, or other receptacle for holding fruit or other things to be offered for sale.

B designates the cover, which may be of any form suiting it to fit on top of the pail. The body of the cover B consists of two boards *a b* of suitable thickness, in which the grain runs in a direction making one to cross the other at right angles, as is clearly shown in Fig. 2. This is done for the purpose of strengthening the cover—that is, so that one will protect the other against splitting, as will be understood without further description. The center of the cover B has an opening formed therethrough, and beneath this opening is a basin or pan C, having a beaded flange *c* formed on its edge, as shown. This pan is held in place on the bottom of the cover in any suitable way. It is attached by means of screw-hooks *d*, which are screwed into the cover at various points close to the edge of the flange *c*, so that they can be turned to have the hook *e* extend over the flange to hold the pan in place or have the hook point away therefrom to release the pan. Samples of the fruit or other goods offered for sale are placed in the pan C, and in order to allow said samples to be seen and at the same time not to be pilfered or disturbed they are covered by a glass D, the edges of which are placed between the boards *a b* before the latter are secured together by means of screws *f* or other suitable means.

E designates a protecting-board which in shipping or storing the goods is screwed on top of the cover over the hole formed therethrough to protect the glass D against being accidentally struck by anything and broken. This board E need be barely broad enough to cover the hole made in the cover, to which it may be secured by screws, and it may be rounded or beveled at the edges, as at *g*, so as to prevent it catching upon anything coming into contact therewith and being torn off.

The usefulness of the various features of the cover, as well as all of its parts, and the cover as a whole has been so fully set forth in describing their construction and mode of use as to need no further explanation.

I do not, of course, deem myself bound by details, which may be varied by mechanical skill without varying the nature or spirit of the invention.

I claim—

A cover for pails and other receptacles, consisting of two boards, one superimposed upon the other, their meeting surfaces being flat and arranged so that the grain of one shall cross the other at right angles, a hole formed through the center of the boards, and a glass covering the same, having its edges arranged between the two boards, in combination with a pan having a beaded flanged edge arranged below the hole, and means for supporting the pan in position, said means being connected with the bottom of the cover at several points and adapted to be turned to engage the flange or so as to escape the same and release the same.

In testimony whereof I affix my signature in presence of two subscribing witnesses.

CHARLES F. DIBBLE.

Witnesses:
   IVA M. POSTIER,
   GEO. J. ALLEN.